United States Patent [19]
Whitcher et al.

[11] Patent Number: 6,104,686
[45] Date of Patent: Aug. 15, 2000

[54] COPY PROTECTION MARKS ON A TRANSPARENT LAYER OF AN OPTICAL DISK INDICATING THAT THE DISK HAS BEEN PREVIOUSLY ACCESSED

[75] Inventors: Timothy J. Whitcher; Donald R. Preuss, both of Rochester; Yuan-Sheng Tyan, Webster, all of N.Y.

[73] Assignee: Eastman Kodak Company, Rochester, N.Y.

[21] Appl. No.: 09/013,090

[22] Filed: Jan. 26, 1998

[51] Int. Cl.$^7$ ........................................ G11B 7/00
[52] U.S. Cl. .................. 369/111; 369/84; 369/54; 369/275.3
[58] Field of Search .................. 369/111, 275.1, 369/84, 284, 288, 275.3, 54; 705/57; 428/64.1, 64.4; 430/495, 942; 380/4

[56] References Cited

U.S. PATENT DOCUMENTS

| | | | |
|---|---|---|---|
| 5,128,849 | 7/1992 | Podraczky et al. | 369/284 |
| 5,761,301 | 6/1998 | Oshima et al. | 380/4 |
| 5,841,861 | 11/1998 | Kondo et al. | 705/57 |
| 5,862,121 | 1/1999 | Suzuki | 369/275.1 |
| 5,963,536 | 10/1999 | Vasic et al. | 369/275.3 |

*Primary Examiner*—Tan Dinh
*Assistant Examiner*—Kim-Kwok Chu
*Attorney, Agent, or Firm*—Raymond L. Owens

[57] ABSTRACT

A method for constructing an optical disk and a method of signal detection which permits a read only device, such as a CD-ROM or DVD-ROM reader, to create a permanent mark on a disk in such a way that it can be subsequently determined that the disk had been previously accessed is disclosed. Such a disk facilitates the operation of CD-ROM or DVD-ROM based systems where the behavior depends on whether or not the information on the optical disk had been previously accessed.

14 Claims, 4 Drawing Sheets

COPY PROTECTION MARKS ON A TRANSPARENT LAYER OF AN OPTICAL DISK INDICATING THAT THE DISK HAS BEEN PREVIOUSLY ACCESSED

CROSS REFERENCE TO RELATED APPLICATIONS

The present invention is related to U.S. patent application Ser. No. 08/962,940 filed Oct. 28, 1997, now U.S. Pat. No. 5,963,536, issued on Oct. 5, 1999 entitled "Copy Count Protection Structure for Optical Recording Medium and Method for Same" to Bane V. Vasic et al. now U.S. Pat. No. 5,963,536, issued Oct. 5, 1999; and U.S. patent application Ser. No. 09.013,650, filed Jan. 26, 1998, entitled "Recordable Elements Comprising a Super-Sensitive Markable Phase-Change Layer" to Kee Chuan Pan et al, assigned to the assignee of the present invention. The disclosure of these related applications is incorporated herein by reference.

FIELD OF THE INVENTION

The present invention relates to optical disks with indicator marks for providing information as to whether the disk has previously been accessed and to methods of reading such disks.

BACKGROUND OF THE INVENTION

Read only optical disks such as CD-ROM and DVD-ROM are used to disseminate software, audio, and recently, motion imaging. With each of these information types there have been concerns of illegal copying of the information. The recording industry has used various methods of data identification, data authentication, and data encryption to facilitate the prevention of illegal copying.

There is a generic problem of determining if the information on an optical disk has been previously accessed. Often, the first access to information is to be treated differently than subsequent accesses. To determine if a particular disk has been previously accessed, information must be recorded on the disk during the first access to indicate that a previous access has occurred. This is not possible on a ROM disk such as an audio CD. Furthermore, devices which only read optical disks, such as CD-ROM drives, DVD-ROM drives, or CD, DVD, and LD (Laser Disk) Video Players do not have the capability to drive the laser to a sufficiently high power to mark an optical disk, nor to modulate the laser power, which is the method used to record information on the optical disk.

SUMMARY OF THE INVENTION

It is an object of the present invention to provide a markable optical disk which is compatible with read channel specifications, that can be marked with such a read only device thereby enabling a drive to mark the said markable optical disk when it is accessed, and subsequently, to read the mark and determine in a later session whether the disk has been previously accessed.

It is another object of the present invention to enable an optical disk read back device (or disk reader) with limited laser power or having no capacity to modulate laser power to mark the said markable optical disk. This will enable the disk reader to determine if the markable optical disk has been previously marked.

These objects are achieved by providing a method of providing indicator marks on the said markable optical disk resulting from a marking process in a disk reader, the optical disk having at least one transparent layer for inclusion of information marks; a reflective layer provided over the transparent layer and having at least one aperture; and a layer including a laser markable material which is adapted to provide an indicator mark when a laser read beam passes through the transparent layer and the aperture in the reflective layer to indicate that the optical disk has been marked, comprising the step of:

a) rotating an optical disk;

b) executing a reading process in which a continuous laser is directed through the transparent layer for reading the information marks; and c) executing a marking process in which the continuous laser is directed the through the aperture such that the optical properties (such as reflectivity) of the laser markable material are altered to form an indicator mark, and the optical properties of the reflective layer are substantially unaltered.

In accordance with the present invention an optical disk such as a CD-ROM or a DVD-ROM, is predominantly coated with a reflective layer such as aluminum. Selected regions of the disk have been masked during the reflective layer coating process, creating one or more apertures in the reflective layer, so that a thin film of a particularly sensitive laser markable material such as a "write once" phase change alloy can be applied, and can be inspected by the readback device's read beam.

ADVANTAGES

It is an advantage of the present invention to be able to mark a prerecorded optical disk as having been accessed without requiring the read back device to have a laser beam that must be modulated and that must achieve the high powers normally associated with writing information marks.

It is a further advantage of the present invention in that the markable optical disk used is compatible with existing read channel specifications and the markable optical disks can be used in existing read back devices that do not perform marking.

It is a feature of the present invention that markable optical disks can be used in copy count schemes described in commonly assigned U.S. patent application Ser. No. 08/962,940 filed Oct. 28, 1997 to Bane V. Vasic et al. and in scenarios where the read back device needs to determine if the optical disk was previously read.

DETAILED DESCRIPTION OF THE INVENTION

The present invention is particularly suitable for use with optical disks that have been previously recorded with information marks, and more particularly to CD-ROM, DVD-ROM, and DVD-Video which have embossed information marks arranged in tracks, as well as pre-recorded CD-R and DVD-R disks which have recordable information marks that have been created by moving a high power modulated laser beam along embossed grooves which define tracks. Such recordable information marks can be deformations in a recording layer, amorphous zones in a crystalline phase change layer, crystalline zones in an amorphous phase change layer, or altered zones in a dye layer.

Figure 1:
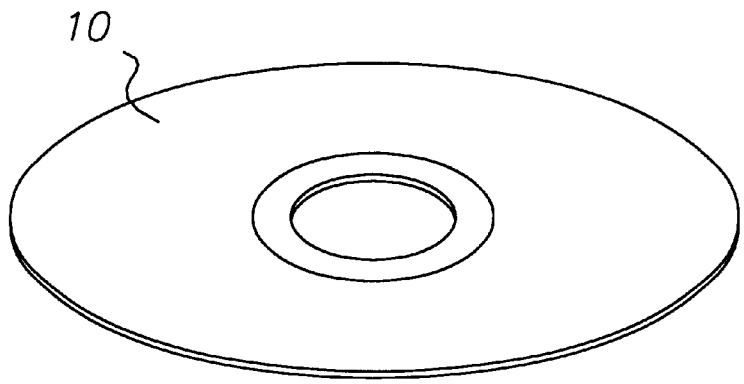
FIG. 1 depicts an optical disk in accordance with the present invention, which, for example, could be a CD-ROM or a DVD-ROM.
Figure 2:
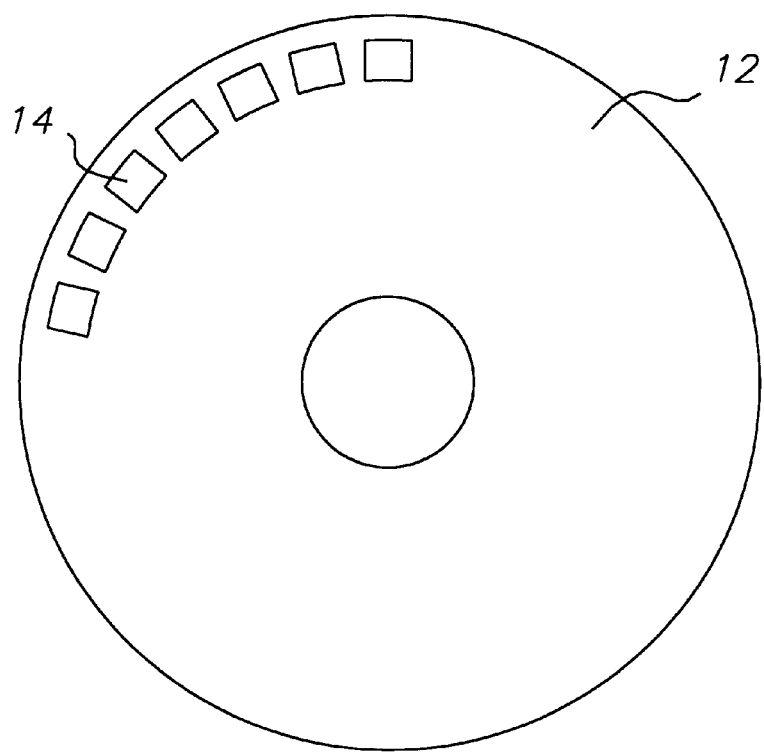
FIG. 2 shows one way of how apertures could be positioned in the reflective layer.
Figure 3:
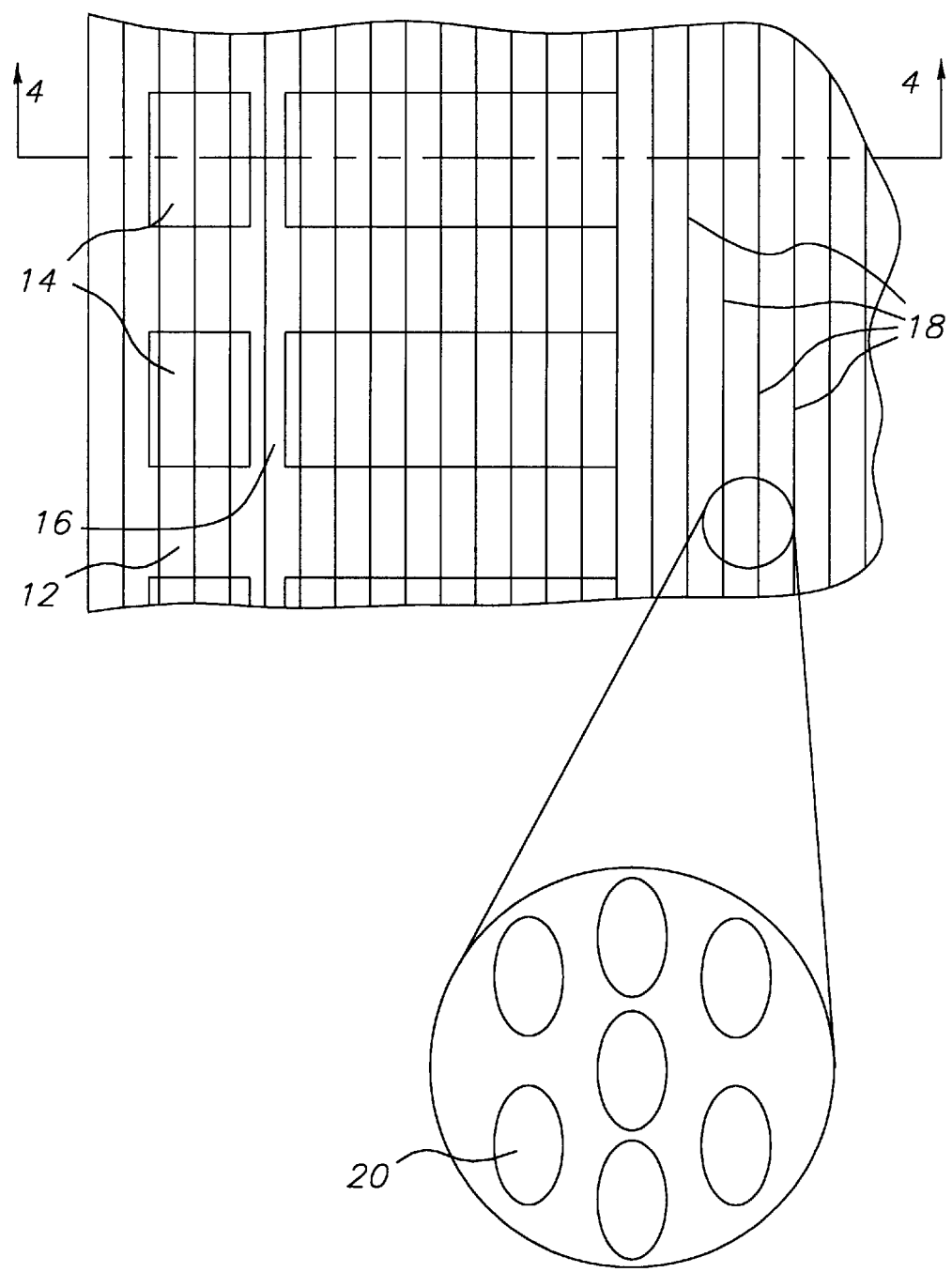
FIG. 3 is a more detailed view of a disk which utilizes a reflective layer as in FIG. 2 and also showing the embossed or recorded data tracks and a sequence of apertures positioned parallel to the direction of the tracks (the figure is not drawn to scale.)
Figure 4:
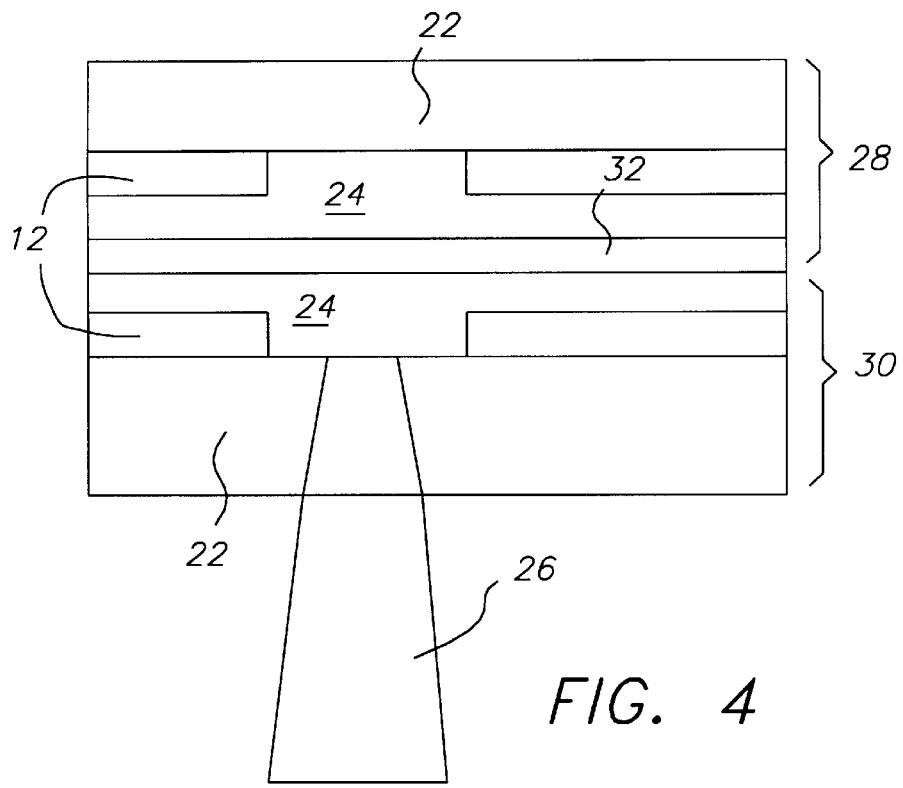
FIG. 4 is a cross section view of the disk in FIG. 3, showing the different layers of a double sided optical disk.

The present invention includes an optical recording disk and a method of marking and inspecting that disk. An optical disk 10 (see FIG. 1) includes a transparent layer 22 (see FIG. 4) which includes a transparent substrate and an optional semi-transparent recording layer, with recording tracks 18 of embossed or recorded information marks 20 (see FIG. 3). The surface of the transparent layer bearing the information marks is predominantly coated with a reflective layer 12, such as aluminum, except for one or more apertures 14, formed in the reflective layer (see FIG. 2 and FIG. 3). The apertures are coated with a layer of laser markable material 24, such as a "write once" phase change material (FIG. 4).

An inspection process is executed by a disk reader 46 (FIG. 6) in which a laser read beam (typified by low power and lack of power modulation) 26 traverses one or more apertures 14 as it is scanned along a recording track 18 (see FIG. 3), producing a read back signal which is modulated by the diffraction and reflectivity of the information marks 20. When the track being scanned by the laser read beam 26 traverses apertures 14 in the reflective layer, the read back signal of an unmarked track 34 shown in FIG. 5 has a high frequency modulation due to the information marks, and a low frequency envelope the amplitude and magnitude of which is caused by the different reflectivities of the reflective layer 12 and the laser markable material 24 shown in FIG. 4, and the frequency of which is caused by the widths and spacings of the apertures in a direction parallel to the recording tracks 18. An AC signal of an unmarked track 36 (see FIG. 5), the amplitude of which is proportional to the reflectivity difference between the reflective layer 12 and the laser markable material 24 can be extracted from the read back signal by an appropriate band pass filter 44 which is incorporated in the read back channel of a disk reader 46 (see FIG. 6).

Figure 5:
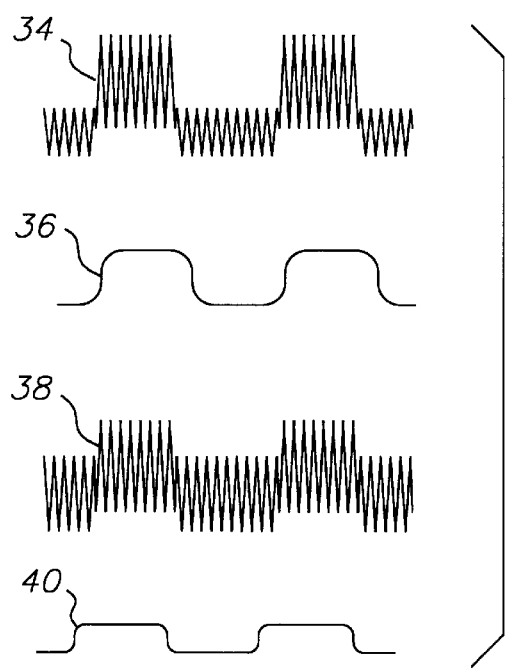
FIG. 5 shows read back signals affected by traversing the apertures with the laser read beam in an unmarked and a marked track.

Exposure of a track which traverses apertures 14 in the reflective layer, will alter the optical properties of the laser markable material 24, (see FIG. 4) causing the reflectivity of the said material also to be altered. This "marking process" creates indicator marks 16 and transforms an unmarked track into a marked track. With reference to FIG. 5, the read back signal 38 of a marked track is identical to the read back signal 34 of an unmarked track except that the amplitude and magnitude of the low frequency envelope is altered. This in turn, causes the AC signal 40 of a marked track to be of a different amplitude than the AC signal 36 of an unmarked track. In this manner, the inspection process is used to obtain the AC signal (either 36 or 40) of a track, and by virtue of the signal amplitude, it can determine whether or not the track has been marked.

Figure 6:
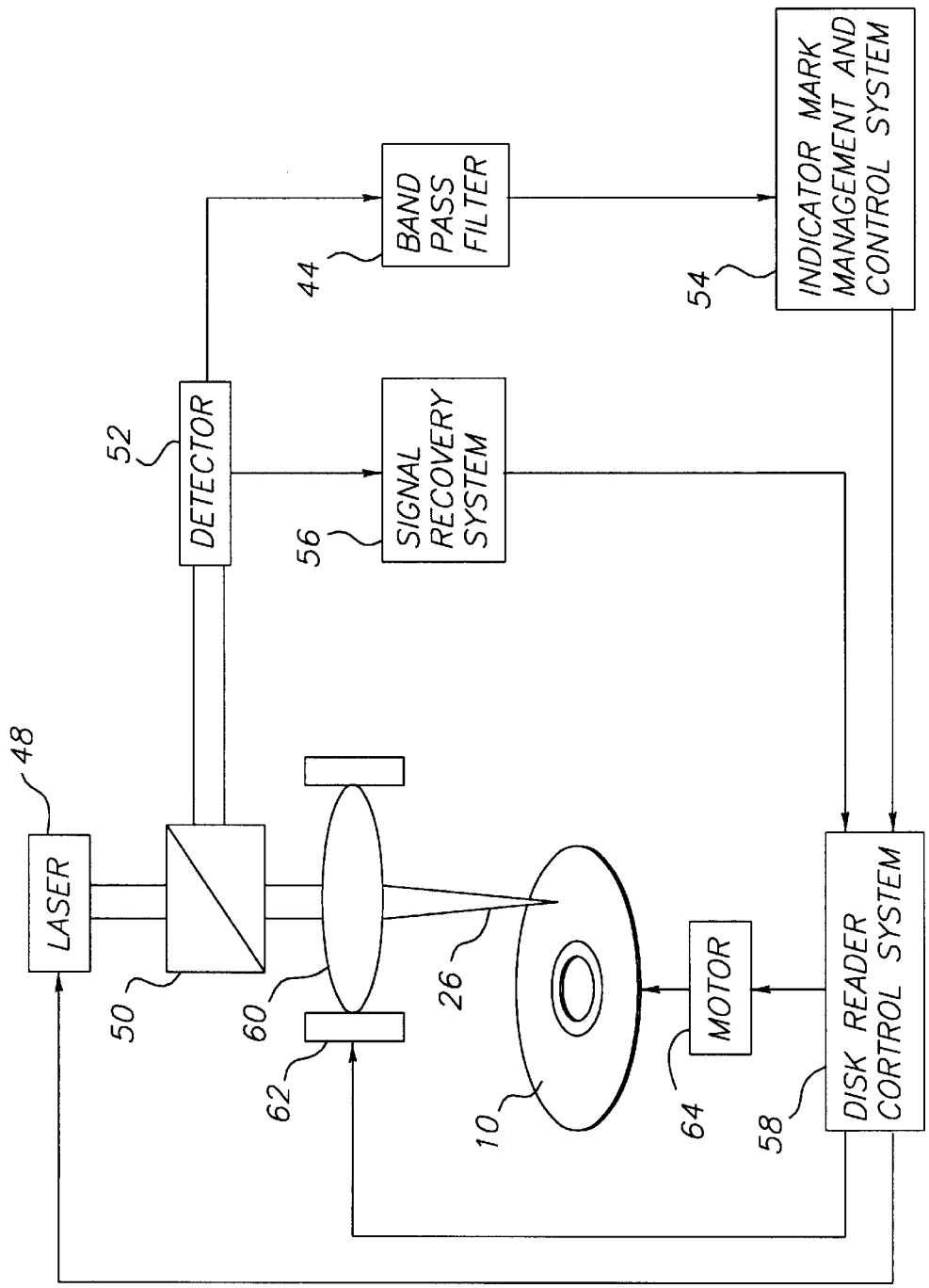
FIG. 6 is a block diagram of a read back device designed to extract the signals shown in FIG. 5.

Turning now to FIG. 6 where a disk reader 46 is shown. The disk reader 46 includes an optical disk 10 mounted on and rotated by a motor spindle 64. A laser 48 produces a beam of laser light that is applied to a beamsplitter 50. A portion of the beam directly passes through the beamsplitter and an objective lens 60 forming a laser read beam 26 which illuminates an optical disk 10. Light reflected from the optical disk is directed by the beamsplitter 50 to a detector 52. The detector produces electrical signals which are applied to the signal processing system 56 which extracts data, as well as tracking, focus and spindle control signals which are then applied to the disk reader control system 58. One of the signals produced by the detector is the readback signal (either 34 or 38) which is applied to a band pass filter which produces the AC signal (either 36 or 40) of a track. The AC signal (either 36 or 40) is applied to the indicator mark management and control system 54 which detects the presence of indicator marks 16 as a result of the inspection process, and monitors the creation of indicator marks during the marking process. The status of the indicator marks, as well as the data and control signals from the signal recovery system 56 are all applied to the disk reader control system 58 which is responsible for controlling the power of the laser 48, the speed of the motor 64, and the tracking and focus servos 62 which determine the position of the objective lens 60, and thereby determine the position of the laser read beam 26.

The widths and spacings of the apertures 14 (see FIG. 2) on the optical disk 10 are selected so that a band pass filter 44 used to extract the AC signal (36 or 40) is the same or of similar architecture to band pass filters used to extract other on-disk features such as bar-codes. In another arrangement, the bar-codes would be near the inner disk radius and the apertures 14 would be near the outer disk radius. Such a feature layout would have the added advantage of enabling large apertures, which are easy to manufacture, to yield the same frequency as smaller bar-code marks when operating the disk in constant angular velocity mode.

The apertures 14 in the reflective layer 12 (see FIG. 2) can be optionally aligned with respect to particular information marks 20 to facilitate the detection of the AC signal (36 or 40) that indicates that a recording track 18 is marked. Such alignment would be to register the aperture 14 in the reflective layer 12 so that the apertures are located at known sector addresses with respect to the data recorded in the information marks 20. This would enable the disk reader 46 to synchronize circuitry in the read channel that facilitates the detection of the AC signal 40 that indicates a marked track.

EXAMPLE 1

A polycarbonate transparent layer or substrate 22 of 120 mm diameter and 0.6 mm thickness is embossed with recording marks arranged in tracks having information according to the DVD standard. The transparent layer 22 is coated with an aluminum reflective layer 12 (reflectivity= 90%) except for a series of 10 apertures of width 1 mm, and spaced with centers 2 mm apart along the outer tracks starting at a radius of 58 mm, and extending to the outer edge of the disk at 60 mm. The apertures 14 are coated with 60 nm of a write once phase change layer including an amorphous alloy of Sb, In, and Sn (reflectivity=40%). Referring to FIG. 4, this first recording unit 28 is laminated to a second recording unit 30 by introducing a bonding layer 32 between them, producing a typical double sided DVD package.

Reading a recording track 18 which passes through the aperture sequence (inspection process) produces the typical read back signal of an unmarked track 34, and the corresponding AC signal 36 of an unmarked track. The amplitude of the AC signal is above a predefined threshold, indicating to the disk reader control system 58 that the track is "unmarked". The inspection process will not "mark" the track because the write once phase change layer will not mark at the normal read back disk rotation rate. In order to mark the disk, the rotation rate is decreased by a factor of 2× thereby doubling the time for which the laser markable material is exposed to laser light from the laser read beam 26, causing the write once phase change material to crystallize, and its reflectivity to increase from 40% to 60%. This creates an indicator mark 16 in the exposed track in each of the ten apertures. The creation of a series of indicator marks is referred to as the "marking process". The envelope of the read back signal 38 changes, and amplitude of the AC signal of the track 18 decreases substantially due to the now smaller reflectivity difference between the phase change alloy and the aluminum reflector. The amplitude of the AC signal is now below the predefined threshold, causing the indicator mark management and control system 54 to recognize the track as having been "marked". It should now be clear that the angular velocity of the rotating optical disk 10 is smaller during the marking process than it is during the reading process.

EXAMPLE 2

The recording element described in Example 1 is analyzed by the inspection process in example 1. The inspection process will not "mark" the track because the write once phase change layer will not mark at the normal read back disk rotation rate with the normal laser read beam power. In order to mark the disk, the laser read beam power is increased by a factor of 2× thereby doubling the energy to which the laser markable material is exposed, causing the write once phase change material to crystallize, and its reflectivity to increase from 40% to 60%. The marking process is now completed, and the inspection process now determines that the track has been marked. It should now be clear that the marking process is accomplished with a higher laser power than the reading process.

EXAMPLE 3

The recording element described in Example 1 is marked by the marking process described in Example 1 or Example 2. The width of the indicator marks 16 in the phase change material is narrower than the laser read beam 26 itself, due to the near Gaussian power distribution and low power of the laser read beam 26. The track is exposed to the laser read beam for three additional marking passes. Additionally, the tracking control signal which is normally generated by the disk reader control system 58 to control the position of the objective lens 60 thereby keeping the laser read beam 26 aligned with the center of the recording track 16 is varied for each pass, so that the laser read beam 26 exposes a slightly different region relative to the center of the recording track on each pass. This causes the width of the indicator marks 16 to increase, thereby providing a greater change in the AC signal than the marking process described in Examples 1 and 2.

EXAMPLE 4

The recording element of Example 1 is marked with the marking process described in Example 3. The response characteristics of the laser markable material are such that its exposure rate will be influenced by environmental parameters. A lower ambient temperature during the marking process can cause an incompletely marked track. In this regard the detection of a "completely marked track" is made by comparing the AC signal from an earlier rotation to that of a current rotation. When the signal change between rotations is less than a predefined threshold, the marking process is completed. This marking process is more robust than the one described in Example 3.

EXAMPLE 5

The recording element of Example 1 is to be marked by the marking process described in Example 4. Verifying the completely marked track condition by noting the "lack of change" in the AC signal as a result of subsequent marking passes, can be improved by both signal averaging of multiple read passes, as well as multiple marking passes between comparisons. In this case the sequence "r-r-m-m-m-m-m-r-r", where "r" is a read pass, and "m" is a marking pass, is executed one or more times until the difference of the average AC signal of the first two consecutive reads, and the last two consecutive reads, is less than a predefined threshold. This marking process is more robust than the one described in Example 4.

EXAMPLE 6

The recording element of Example 1 is marked by the marking process described in Example 5. The inspection process now determines the state of the recording element by comparing the amplitude of the AC signal (36 or 40) of a potentially marked track with the amplitude of the AC signal 36 of a reference track that is at a known location and is never intentionally marked by a properly operating disk reader. If the difference in the amplitudes of the AC signal levels between the two tracks is larger than a predefined threshold, then the disk is marked. This particular detection method is useful when the marking process described in Example 5 terminates after a maximum number of iterations thereby not guaranteeing an adequate change in the amplitude of the AC Signal for a marked track or when the disk reader 46 is not the same unit which originally marked the recording element thereby making the amplitude of the AC signal subject to drive variability. Use of a reference track minimizes the effects of drive variability, media variability, and environmental variability as all tracks are likely to be affected equally.

The invention has been described in detail with particular reference to certain preferred embodiments thereof, but it will be understood that variations and modifications can be effected within the spirit and scope of the invention.

PARTS LIST

10 optical disk
12 reflective layer
14 aperture (in the reflective layer)
16 indicator mark
18 recording tracks
20 information mark
22 transparent layer
24 laser markable material
26 laser read beam
28 first recording unit
30 second recording unit
32 bonding layer
34 read back signal of an unmarked track
36 AC signal of an unmarked track 38 read back signal of a marked track
40 AC signal of a marked track
42 spindle control servo system
44 band pass filter
46 disk reader
48 laser
50 beam splitter
52 detector
54 indicator mark management and control system
56 signal processing system
58 disk reader control system
60 objective lens
62 tracking and focus servos
64 motor

What is claimed is:

1. A method of providing indicator marks on an optical disk during a marking process in a disk reader, the optical disk having at least one transparent layer for inclusion of information marks; a reflective layer provided over the transparent layer and having at least one aperture; and a layer including a laser markable material which is adapted to provide an indicator mark when a laser read beam passes through the transparent layer and the aperture in the reflective layer to indicate that the optical disk has been marked, comprising the step of:
   a) rotating an optical disk;
   b) executing a reading process in which a continuous laser is directed through the transparent layer for reading the information marks; and
   c) executing a marking process in which the continuous laser is directed through the aperture such that the optical properties (such as reflectivity) of the laser markable material are altered to form an indicator mark, and the optical properties of the reflective layer are substantially unaltered.

2. In the method of claim 1 further including the step of:
   d) executing an inspection process in order to determine if an indicator mark has been formed in the laser markable material.

3. The method of claim 1 wherein the marking process is accomplished by directing the continuous laser through the aperture a plurality of times to form an indicator mark.

4. The method of claim 3 wherein the transparent layer of the optical disk includes recording tracks which include information marks and wherein the marking process includes varying the position of the laser read beam relative to the center of the track as it passes through the aperture on successive rotations of the disk, to create an indicator mark in the laser recordable layer which is wider than would otherwise be created.

5. The method of claim 1 where the angular velocity of the rotating optical disk is smaller during the marking process than it is during the reading process.

6. The method of claim 1 wherein the laser read beam power is higher during the marking process than it is during the reading process.

7. The method of claim 1 wherein there are a plurality of apertures formed in the reflective layer of the optical disk and the aperture sequence is chosen to provide a readback signal from the indicator marks which has a low frequency envelope of substantially different frequency than the signal due to the information marks.

8. The method of claim 7 further including providing a band pass filter to extract the low frequency component of the readback signal from the indicator marks.

9. A method of inspecting indicator marks provided on an optical disk during a marking process in a disk reader, the optical disk having at least one transparent layer for inclusion of information marks; a reflective layer provided over the transparent layer and having at least one aperture; and a layer including laser markable material which is adapted to provide an indicator mark when a laser read beam passes through the transparent layer and the aperture in the reflective layer to indicate that the optical disk has been marked, comprising the steps of:
   a) rotating an optical disk; and
   b) executing an inspection process in which a continuous laser is directed through the aperture to inspect for the presence of indicator marks.

10. An optical disk comprising:
   a) at least one transparent layer for inclusion of information marks;
   b) a reflective layer provided over the transparent layer and having at least one aperture; and
   c) a layer including a laser markable material which is adapted to provide an indicator mark as the result of executing a marking process.

11. An optical disk comprising:
   a) at least one transparent layer having a recording track for inclusion of recordable information marks;
   b) a reflective layer provided over the transparent layer and having at least one aperture over a portion of the recording tracks; and
   c) a layer including a laser markable material which is adapted to provide an indicator mark in such portion of the recording track as the result of executing a marking process.

12. An optical disk comprising:
   a) at least one transparent layer having a recording track for inclusion of embossed information marks
   b) a reflective layer provided over the transparent layer and having at least one aperture over a portion of the recording track; and
   c) a layer including a laser markable material which is adapted to provide an indicator mark in such portion of the recording track as the result of executing a marking process.

13. A two sided optical disk comprising:
   a) a first recording unit and a second recording unit and a bonding layer securing the first and second recording units;
   b) each recording unit including:
      i) at least one transparent layer having recording tracks for inclusion of information marks;
      ii) a reflective layer provided over the transparent layer and having at least one aperture over a portion of the recording track; and
      iii) a layer including a laser markable material which is adapted to provide an indicator mark in such portion of the recording track as the result of executing a marking process.

14. The two sided optical disk of claim 13 wherein there are a plurality of apertures formed over one or more of the recording tracks.

* * * * *